(No Model.)

W. T. DOLE.
CARRIAGE WHEEL.

No. 247,243. Patented Sept. 20, 1881.

Witnesses.
S. N. Piper
Wm W Lunt

Inventor.
William T. Dole.
by R. H. Eddy atty.

N. PETERS, Photo-Lithographer, Washington, D. C.

UNITED STATES PATENT OFFICE.

WILLIAM T. DOLE, OF PEABODY, MASSACHUSETTS.

CARRIAGE-WHEEL.

SPECIFICATION forming part of Letters Patent No. 247,243, dated September 20, 1881.

Application filed August 14, 1880. (No model.)

*To all whom it may concern:*

Be it known that I, WILLIAM T. DOLE, of Peabody, of the county of Essex and State of Massachusetts, have invented a new and useful Improvement in Carriage-Wheels; and I do hereby declare the same to be described in the following specification and represented in the accompanying drawings, of which—

Figure 1:
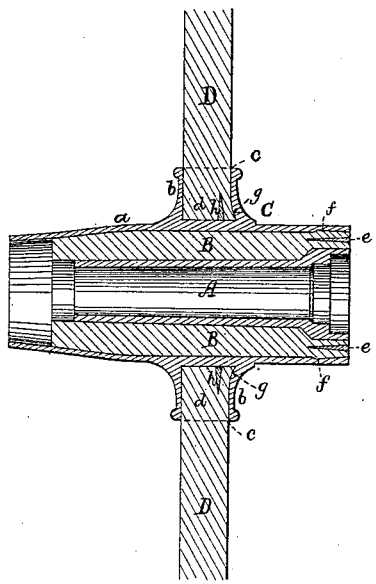
Figure 3:
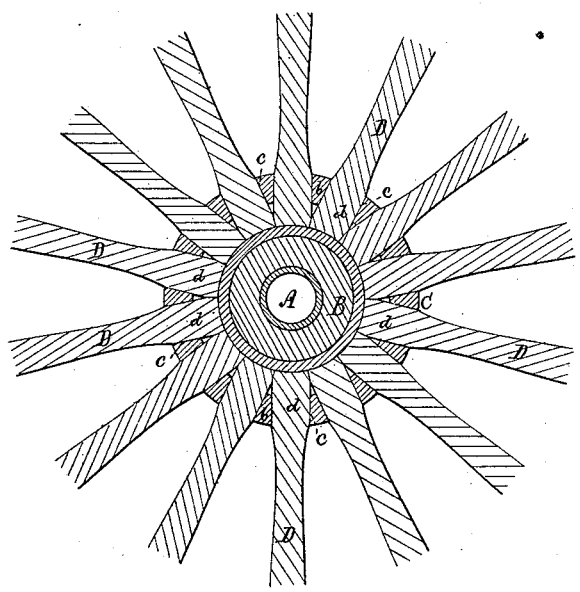
Figure 2:
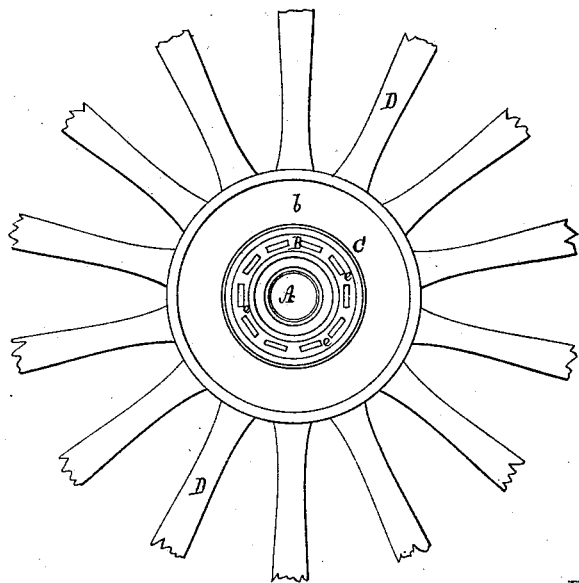

Figure 1 is a longitudinal section, Fig. 2 a rear end view, and Fig. 3 a transverse section, of a carriage-wheel hub and portions of the spokes thereof, constructed and combined in accordance with my invention, the nature of which is defined in the claim hereinafter presented.

The object of my present improvement is the production of a very strong and durable hub, and the connection of it and the spokes in a manner highly advantageous for keeping them in engagement, as well as for preventing the spokes from working loose in their sockets of the hub.

In carrying out my invention I compose the hub of three main essential parts or members, (marked in the drawings A, B, and C.) The first part, A, is a metallic sleeve or box for reception of the journal of the axle and to turn thereon. The third part, C, is of metal, and cast in one piece, it consisting of a tubular cap, *a*, and a wide flange, *b*, the latter extending from and around the cap, and having a series of mortises or sockets, *c*, made in it radially for reception of the inner tenons, *d*, of the spokes D. The intermediate or second part, B, is a tube or tubular connection of wood. It encompasses the metallic sleeve, and is encompassed by the part C, into which it is to be tightly driven or fitted.

In making the hub, I generally force into the bore of the cap *a* a solid plug of wood, to extend from the rear to, or nearly to, the front end of the said cap, after which I bore out the said plug in a proper manner to receive the metallic sleeve A. This sleeve I drive firmly into the bore of the plug, and subsequently I drive into the rear end of the plug a series of wedges, *e*, so as to expand the plug and force it into an annular groove, *f*, made in and around the metallic sleeve *a*, such groove being shown in transverse section in Fig. 1. Prior to driving the plug into the sleeve *a*, I usually heat such sleeve, so as to expand it, in order that in cooling it may contract upon the wooden plug. While the part *a* is so heated, I drive or force into it the wooden plug. Furthermore, there is in the flange *b* an annular groove, *g*, which extends around and within the flange, and opens out of each of its spoke-sockets, such groove being shown in transverse section in Fig. 1. Previous to inserting each spoke D into its socket of the hub, I insert for a short distance into the tenon of the spoke a wedge, *h*. Having done this and inserted the said wedge and tenon endwise into the receiving-socket, I drive or force the spoke into the socket and against the wedge, whose butt is to be supposed to bear against the bottom of the socket. In thus driving the spoke into the socket and against the wedge the latter will be caused to enter the spoke-tenon and expand it into the groove *g*, whereby the spoke will be firmly held in its socket.

In some cases I make the part B of other proper material than wood—as, for instance, a composition or cement which, before or after being inserted in the cap, will become sufficiently solid or hard for the purpose.

The above-described wheel-hub differs from that shown in the United States Patents Nos. 109,707 and 127,638, inasmuch as the spokes have their tenons wholly in the metallic cap C, without in any respect entering the wooden connection B, whereby such connection is not weakened by mortises cut in it to receive the spoke-tenons. Furthermore, the groove *g* is in the cap C, and in no respect in the wooden connection, and the hubs shown in the said patents have in their caps no annular groove like the groove *f* of the said cap C. My wheel-hub differs from that shown in the United States Patent No. 153,384, which has its outer shell composed of two separate tapering cylinders, having flanged rims held together and upon a double tapering wooden bushing by screws formed on them, whereas my tubular cap is in one solid piece of metal, and has separate sockets in its flange, the whole saving the necessity of making the cap in separate parts and screwing one to the other. My wheel-hub also differs from those shown in the United States Patents Nos. 155,598 and 155,918, each of which has no series of separate sockets for receiving the spokes, such spokes being arranged in one annular recess and abutting one against the other, whereas in my hub each spoke not only abuts against those next to it, but is separated therefrom by intermediate metallic bearings or parts of the metallic cap, the spokes, on shrinking, thereby not being so liable to work loose in the hub as when they abut against each other without any such metallic interventions. In my wheel-hub I have, besides the metallic box and its surrounding sleeve of wood, a metallic encompassing sleeve, having a spoke-receiving flange cast in one piece, and provided with separate spoke-sockets, having no opening joint or communication from either of them, whereby grease or oil can get from either of the inner sleeves into the spoke-sockets, it being all-important to prevent any oil or grease from working into any such socket, on account of it causing loosening of the spoke therein. My wheel-hub differs from that shown in the United States Patent No. 129,590, which has no wooden sleeve around its journal-box, nor has it any outer sleeve having a socketed flange cast in one piece with the rest of the sleeve, and provided with sockets closed at their bottoms, so as to prevent the entrance of oil into them—the said sockets.

I claim as my invention as follows, viz:

The combination, with the metallic journal-box and its surrounding sleeve of wood, of the metallic encompassing sleeve and its spoke-receiving flange, cast or made in one piece, and provided with separate spoke-sockets, closed at their bottoms or having no opening joint or connection from either of them to the wooden sleeve or journal-box, whereby grease or oil can work therefrom into such sockets.

WILLIAM T. DOLE.

Witnesses:
R. H. EDDY,
WM. W. LUNT.